(12) United States Patent
Gratton (10) Patent No.: US 9,106,489 B2
(45) Date of Patent: Aug. 11, 2015

(54) METHOD AND APPARATUS FOR UPDATING A NETWORK ADDRESS OF AN AUDIO/VIDEO NODE TO A COMMUNICATION DEVICE

(75) Inventor: Max S. Gratton, Lakewood, CO (US)

(73) Assignee: DISH Network, L.L.C., Englewood, CO (US)

( * ) Notice: Subject to any disclaimer, the term of this patent is extended or adjusted under 35 U.S.C. 154(b) by 1465 days.

(21) Appl. No.: 12/175,115

(22) Filed: Jul. 17, 2008

(65) Prior Publication Data

US 2010/0017838 A1     Jan. 21, 2010

(51) Int. Cl.
*H04N 7/16*     (2011.01)
*G06F 17/00*    (2006.01)
*H04L 29/12*    (2006.01)
*H04N 21/438*   (2011.01)
*H04N 21/426*   (2011.01)
*H04N 21/647*   (2011.01)
*H04N 21/61*    (2011.01)
*H04N 7/173*    (2011.01)

(52) U.S. Cl.
CPC ...... *H04L 29/12301* (2013.01); *H04L 61/2076* (2013.01); *H04N 21/42684* (2013.01); *H04N 21/438* (2013.01); *H04N 21/6125* (2013.01); *H04N 21/64707* (2013.01)

(58) Field of Classification Search
USPC ............ 705/11; 725/110, 112, 118, 120, 111, 725/121; 709/242, 231; 370/313, 395.54
See application file for complete search history.

(56) References Cited

U.S. PATENT DOCUMENTS

| | | | |
|---|---|---|---|
| 6,178,160 B1* | 1/2001 | Bolton et al. | 370/255 |
| 7,159,034 B1* | 1/2007 | Rai | 709/238 |
| 7,174,512 B2* | 2/2007 | Martin et al. | 715/719 |
| 7,783,800 B2* | 8/2010 | Staats et al. | 710/64 |

(Continued)

FOREIGN PATENT DOCUMENTS

| | | |
|---|---|---|
| DE | 102006021159 A1 | 11/2007 |
| WO | 2004064432 A | 7/2004 |

(Continued)

OTHER PUBLICATIONS

International Preliminary Report on Patentability for PCT/US2009/050738 dated Jan. 18, 2011, 8 pages.

(Continued)

*Primary Examiner* — Pankaj Kumar
*Assistant Examiner* — Reuben M Brown
(74) *Attorney, Agent, or Firm* — Kilpatrick Townsend & Stockton LLP (57) ABSTRACT

A method for updating a network address of an audio/video node of a communication network to a communication device is provided. In the method, a communication identifier associated with the communication device is received at the audio/video node. Also received at the audio/video node, by way of the communication network, is a network address of the audio/video node. In response to receiving the network address, a message is transferred from the audio/video node to the communication device using the communication identifier, wherein the message comprises the network address. A request for audio/video data is transferred from the communication device over the communication network to the audio/video node using the network address. In response to receiving the request, the audio/video data is transferred from the audio/video node over the communication network to the communication device.

20 Claims, 4 Drawing Sheets

(56) References Cited

U.S. PATENT DOCUMENTS

| | | |
|---|---|---|
| 8,135,844 B2* | 3/2012 | Kikkawa et al. ............... 709/227 |
| 2003/0217126 A1* | 11/2003 | Polcha et al. ................. 709/220 |
| 2003/0229697 A1* | 12/2003 | Borella ......................... 709/226 |
| 2005/0054343 A1 | 3/2005 | Nykanen et al. |
| 2006/0095401 A1 | 5/2006 | Krikorian et al. |
| 2006/0172766 A1* | 8/2006 | Kim et al. .................. 455/553.1 |
| 2006/0294257 A1* | 12/2006 | Kumano et al. ............... 709/245 |
| 2007/0091887 A1* | 4/2007 | Ko et al. ...................... 370/389 |
| 2007/0299873 A1* | 12/2007 | Jones et al. ................ 707/104.1 |
| 2008/0287150 A1* | 11/2008 | Jiang et al. ................... 455/466 |
| 2009/0034539 A1* | 2/2009 | Kawai et al. .................. 370/400 |
| 2010/0173622 A1* | 7/2010 | Maurya et al. ................ 455/419 |
| 2012/0054804 A1* | 3/2012 | Howcroft ........................ 725/58 |

FOREIGN PATENT DOCUMENTS

| | | |
|---|---|---|
| WO | 2004075524 A | 9/2004 |
| WO | 2010/009260 A2 | 1/2010 |

OTHER PUBLICATIONS

International Search Report and Written Opinion for PCT/US2009/050738 dated Jan. 13, 2010, 11 pages.

* cited by examiner

METHOD AND APPARATUS FOR UPDATING A NETWORK ADDRESS OF AN AUDIO/VIDEO NODE TO A COMMUNICATION DEVICE

BACKGROUND

Previously, a subscriber of audio/video data, such as television programs transmitted by way of satellite or cable television broadcast systems, was limited to a few physical locations at which the subscriber could view the data. More specifically, a subscriber was required to be co-located with a satellite or cable set-top box directly connected to a satellite antenna or coaxial cable to view their favorite programs, including those the subscriber recorded by way of a digital video recorder (DVR) connected to, or integrated with, the set-top box.

However, such physical restrictions have been eliminated with the development of network-attachable audio/video devices, such as the Slingbox™ by Sling Media, Inc, which are capable of transferring audio/video data from a number of sources, such as satellite and cable set-top boxes, digital video disc (DVD) players, and coaxial cable connections, over a network to a remotely-located display device. As a result, a subscriber away from home may now access his set-top box or other audio/video source by way of a desktop or laptop computer, mobile phone, personal digital assistant (PDA), or other similarly-configured communication device, by connecting to the audio/video device or node over the Internet to view a variety of audio/video programming of interest.

Typically, the communication device connects to the audio/video node over the network by way of an easily-remembered Internet domain name. To this end, the communication device normally places a request over the network to a Domain Name System (DNS) server, which responds to the domain name with an IP (Internet Protocol) address. The communication device then employs the IP address to communicate with, and receive audio/video data from, the audio/video node. Such a process is often necessitated by an Internet service provider (ISP) dynamically assigning IP addresses to the audio/video node and other network nodes within its purview. In one example, dynamic assignment of IP addresses allows a particular IP address to be assigned to any of a number of nodes, thus allowing the use of fewer IP addresses compared to the number of nodes being serviced, assuming fewer than all of the nodes are connected to the network at any one time.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
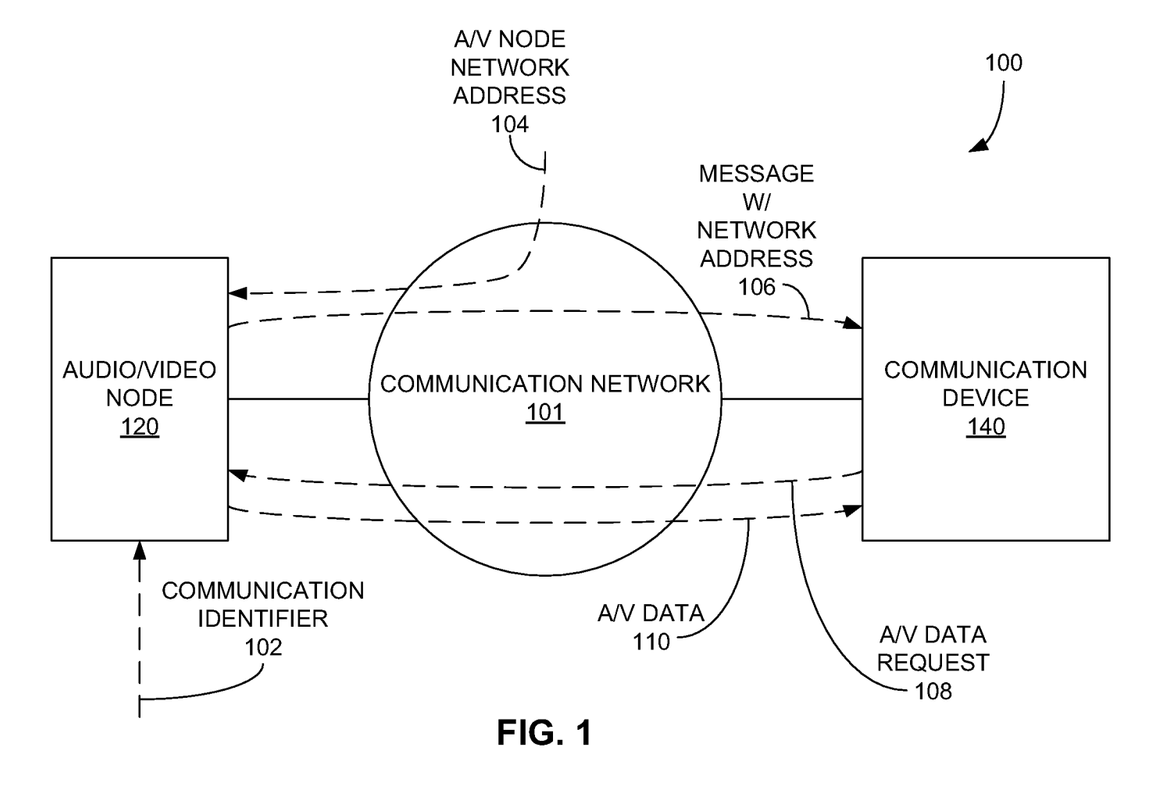
FIG. 1 is a block diagram of a communication system employable to update a network address of an audio/video node to a communication device according to an embodiment of the invention.

FIG. 1 is a simplified depiction of a communication system 100 including an audio/video node 120 and a communication device 140 coupled together by way of a communication network 101 according to an embodiment of the invention. Generally, the audio/video node 120 provides audio/video data over the communication network 101 to the communication device 140 in response to a request from the device 140 to the audio/video node 120 for the audio/video data.

Figure 2:
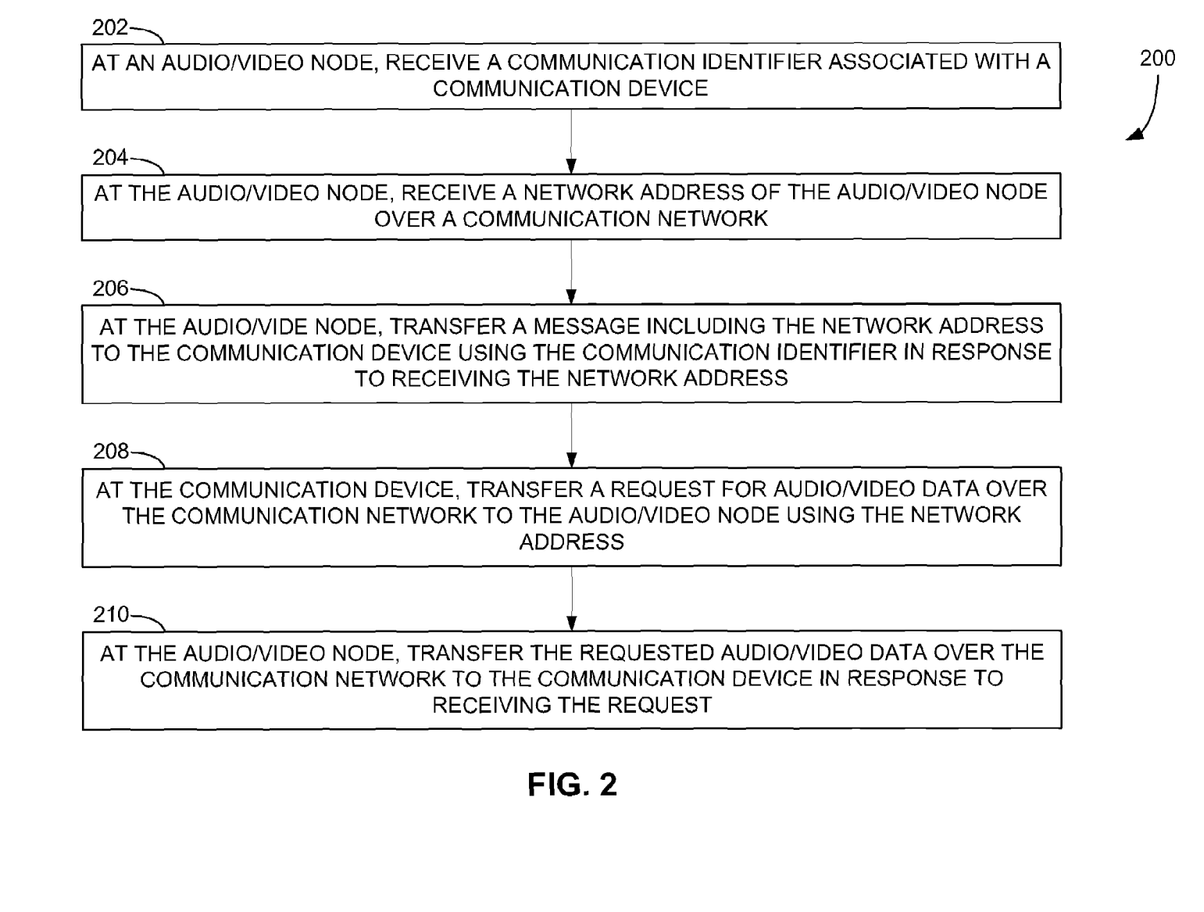
FIG. 2 is a flow diagram of a method according to an embodiment of the invention for updating a network address of an audio/video node to a communication device employing the communication system of FIG. 1.

In reference to the communication system 100 of FIG. 1, FIG. 2 provides a flow diagram of a method 200 for updating a network address of the audio/video node 120 of the communication network 101 to the communication device 140 to facilitate the abovementioned transfer of audio/video data from the audio/video node 120 to the communication device 140. However, while FIG. 2 is described in particular reference to the system 100 of FIG. 1, the method 200 may be implemented in conjunction with other communications systems not specifically discussed herein. Also, the operations of the method 200 may be performed in other orders than that shown specifically in FIG. 2, including concurrent execution of at least two of the operations, while remaining within the scope of the invention.

In the method 200, the audio/video node 120 receives a communication identifier 102 associated with communication device 140 (operation 202). The audio/video node 120 also receives a network address 104 of the audio/video node 120 by way of the communication network 101 (operation 204). In response to receiving the network address 104, the audio/video node 120 transfers a message 106 including the network address 104 to the communication device 140 using the communication identifier 102 (operation 206). The communication device 140 transfers a request 108 for audio/video data over the communication network 101 to the audio/video node 120 using the network address 104 (operation 208). In response to receiving the request 108, the audio/video node 120 transfers the requested audio/video data 110 over the communication network 101 to the communication device 140 (operation 210).

Figure 3:
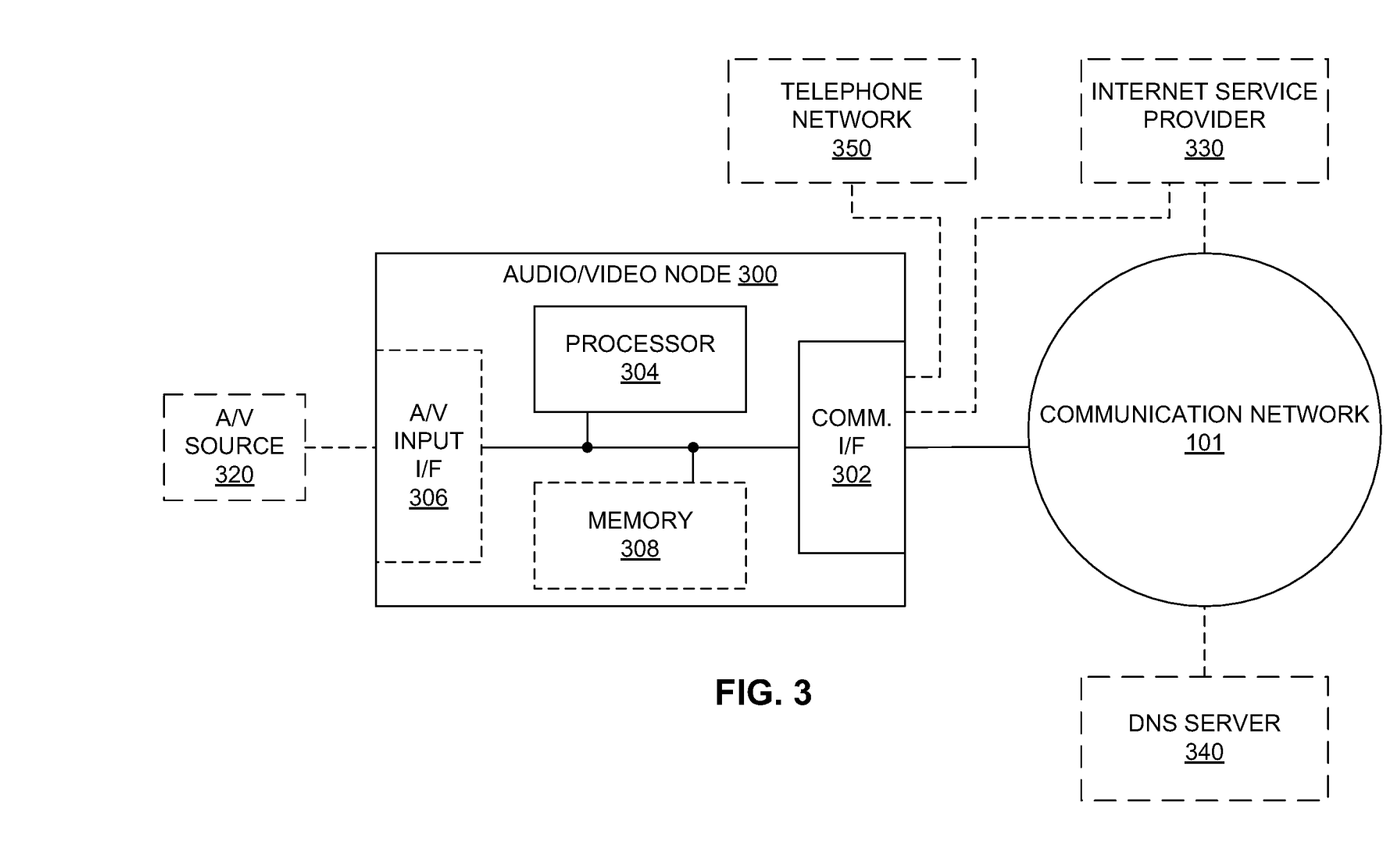
FIG. 3 is a block diagram of an audio/video node according to an embodiment of the invention.

FIG. 3 illustrates by way of block diagram an audio/video node 300 according to an embodiment of the invention, which may serve as the audio/video node 120 of FIG. 1. One possible example of the audio/video node 300 is a space-shifting audio/video device, such as any of the Slingbox™ devices developed by Sling Media, Inc, which may connect with the Internet or other network and transfer audio and/or video data over the network on request to a receiving device. Other devices capable of delivering audio/video data over a communication network in response to requests for such data may also serve as the audio/video node 300 in other implementations.

The audio/video node 300 includes a communication interface 302 and a processor 304. The communication interface 302 is configured to couple the audio/video node 300 to a communication network, such as the network 101 shown in FIG. 1. One example of the communication network 101 is a Transfer Control Protocol/Internet Protocol (TCP/IP) based wide-area network (WAN), such as the Internet. However, other communication networks capable of transferring messages and data between nodes of the network, such as a local area network (LAN), may also serve as the communication network 101 shown in FIG. 3.

The communication interface 302 may include circuitry to couple the audio/video node 300 to a phone line, coaxial cable, or other means for connecting with a network service provider, such as an Internet service provider (ISP). For example, the communication interface 302 may include circuitry for operating as a Digital Subscriber Line (DSL) or cable modem (modulator-demodulator) for connection with a phone line or coaxial cable.

In another example, the communication interface 302 may include circuitry for connecting the audio/video node 300 with an external network gateway or router, such as a DSL or cable modem, for coupling with the network 101. Such a connection may be wired (such as by way of an Ethernet connection) or wireless (such as through an IEEE 802.11 (Wi-Fi) connection). Other methods for connecting the audio/video node 300 with the communication network 101 may be utilized in other implementations.

The processor 304 of FIG. 3 is coupled with the communication interface 302. In one embodiment, the processor 304 may be one or more microprocessors, microcontrollers, digital signal processors (DSP), or any other processor configured to execute software instructions for performing the various tasks identified with the processor 304, as discussed in greater detail below. The software may be stored in a memory, such as a memory 308 shown in FIG. 3, or a memory located internal to the processor 304. In another example, the processor 304 may be a collection of hardware logic circuitry to perform the functions described below, or a combination of software and hardware elements.

The processor 304 is configured to receive a communication identifier associated with a communication device, such as the communication device 140 of FIG. 1, which is accessible over the communication network 101 by way of the communication interface 302. In one implementation, the communication identifier may be any value, such as a string of numbers or other characters, that uniquely identifies the communication device for communication purposes. For example, if the communication device 140 is a cellular phone, the communication identifier may be a telephone number associated with the phone. In another example, if the communication device 140 is a computer, PDA, or cellular phone providing access to an e-mail account, the communication identifier may be an e-mail address. Similarly, if the communication device 140 is a computer or other device addressable over the Internet or similar network, the communication identifier may be an Internet Protocol (IP) address or similar network address. In further implementations, other types of communication identifiers may be employed, depending on the particular communication technology to be employed to send messages from the audio/video node 300 to the communication device 140, as is described in greater detail below.

As seen above, the communication identifier need not be related to, or usable with, the communication network 101 of FIG. 3. For example, while the communication network 101 may be an IP-based network, the communication identifier may be a phone number employed in conjunction with a telephone network 350, such as a cellular phone network, a public switched telephone network (PSTN), or the like.

The processor 304 may receive the communication identifier in a number of different ways. In one example, the processor 304 may receive the communication identifier from the communication device 140 or another device by way of the communication network 101 or another communication path. In another embodiment, the processor 304 may receive the communication identifier by way of manual input of a user via a user panel, remote control, separate input interface, or other means not explicitly shown in FIG. 3. Further, while a single communication identifier is discussed above, the processor 304 may receive multiple communication identifiers, each corresponding to a separate communication device, in other implementations.

The processor 304 is also configured to receive a network address of the audio/video node 300. In one example, the processor 304 receives the network address over the communication network 101 through the communication interface 302. More particularly, the network address may be an IP address of the audio/video node 300. The network address may take other forms consistent with the communication network 101 to which the audio/video node 300 is coupled in other examples.

In many cases, the audio/video node 300 will connect to the communication network 101, such as the Internet, by way of an Internet service provider (ISP) or other network service provider 330, as mentioned above. As a result, the provider 330 may dynamically assign, and periodically change, the IP address of the audio/video node 300 based on conditions existing within the network 101 at a particular time. For example, if the audio/video node 300 is disconnected from the network 101, the ISP 330 may reassign the IP address most recently associated with the node 300 to another device requesting connection with the network 101, as the ISP 330 may have a limited number of IP addresses available for assignment compared to the total number of devices the ISP services. When the node 300 then requests the ISP 330 for reconnection to the network 101, the ISP 330 may assign an IP address to the node 300 that is different from the previous address associated with the node 300. In one example, the ISP 330 may dynamically assign IP addresses to the node 300 and other clients by way of the Dynamic Host Configuration Protocol (DHCP). As a result of the ISP 330 or other network service provider assigning a new network address to the node 300, the provider informs the node 300 of the new network address by transmitting it to the node 300 over the network 101.

Prior to the innovations described herein, the node 300 would have then exclusively informed a Domain Name Service (DNS) server 340 coupled to the communication network 101 of the new network address and a domain name (such as subdomain.domain.com) with which the address is associated, as described above. As a result, other devices attached to the network 101 would then query the DNS server 340 using the domain name, to which the DNS server may have responded with the IP address represented by the domain name so that the requesting device may access the audio/video node 300 using the IP address.

However, to reduce contention for accessing the DNS server 340, as well as to protect against a possible lack of access to the node 300 in view of the DNS server 340 becoming inoperative, the processor 304 of the audio/video node 300 transfers a message including the current network address of the node 300 to the communication device 140. The message is directed to the communication device 140 using the communication identifier described above by way of the communication interface 302 by way of the telephone network 350, the communication network 101, or another communication path. In the example of the processor 304 receiving multiple communication identifiers, the processor 304 transfers a message to each device 140 associated with one of the identifiers.

In the case that the network address is an IP address, the network address may be formatted as a standard IP version 4 (IPv4) address in dotted-decimal notation, such as "172.16.254.1". Other formats, including octal or hexadecimal, with or without intervening periods or other delimiters, may be utilized in other implementations.

The message carrying the network address of the audio/video node 300 may also include other information, such as an indicator signifying that the message carries a new network address for the node 300. For example, if the message is an e-mail message, the subject line or the body of the message may include a unique string of alphanumeric characters indicating that the message includes a new network address. If the message is an instant messaging message or an SMS message, a similar character string may be employed. In one particular example, the character string may include the domain name of the audio/video node 300 to specifically identify the new network address with the node 300 or its domain name.

Thus, each communication device 140 is informed of the current network (IP) address of the audio/video node 300. Given this information, the communication device 140 is then capable of transferring a request for audio/video data over the communication network 101 to the audio/video node 300 using the current network address.

As a result, the processor 304 of the audio/video node 300 receives the request through the communication interface 302. In response to the request, the processor 304 transfers the requested audio/video data through the communication interface 302 over the network 101 to the communication device 140 initiating the request. In one implementation, the audio/video data may conform to the Motion Picture Experts Group (MPEG) standards MPEG-2 or MPEG-4, although other audio/video data formats may be employed in other examples. The audio/video data may also be divided into multiple packets, such as IP packets, by the processor 304 or the communication interface 302 prior to being transferred over the communication network 101.

Prior to transferring the requested audio/video data, the audio/video node 300 may store the data in the memory 308 incorporated within the node 300. Alternatively or additionally, the audio/video node 300 may receive the audio/video from an audio/video source 320 through an audio/video input interface 306 of the node 300. Depending on the particular implementation, the audio/video source 320 may be a receiver device, such as a satellite television set-top box, a cable television set-top box, a terrestrial ("over-the-air") television set-top box, a satellite radio receiver, a cable radio receiver, and a terrestrial radio receiver. In other examples, the audio/video source 320 may be a coaxial cable, antenna, or other device over which multiple television channels may be received. In that case, the audio/video node 300 may also include a tuner or similar circuitry (not explicitly shown in FIG. 3) which may select one of the multiple incoming channels for audio/video capture and ultimate transfer to the requesting communication device 140.

In other embodiments, the audio/video interface 306 may receive audio/video data from a number of other devices, such as a video camera, a digital video disc (DVD) player, a computer, and other devices capable of providing the audio/video data. Such devices may be coupled with the audio/video interface 306 by way of an IEEE 1394 (FireWire) connection, a Universal Serial Bus (USB) connection, a composite or component video connection, or another connection capable of carrying audio/video data in a digital or analog format.

Figure 4:
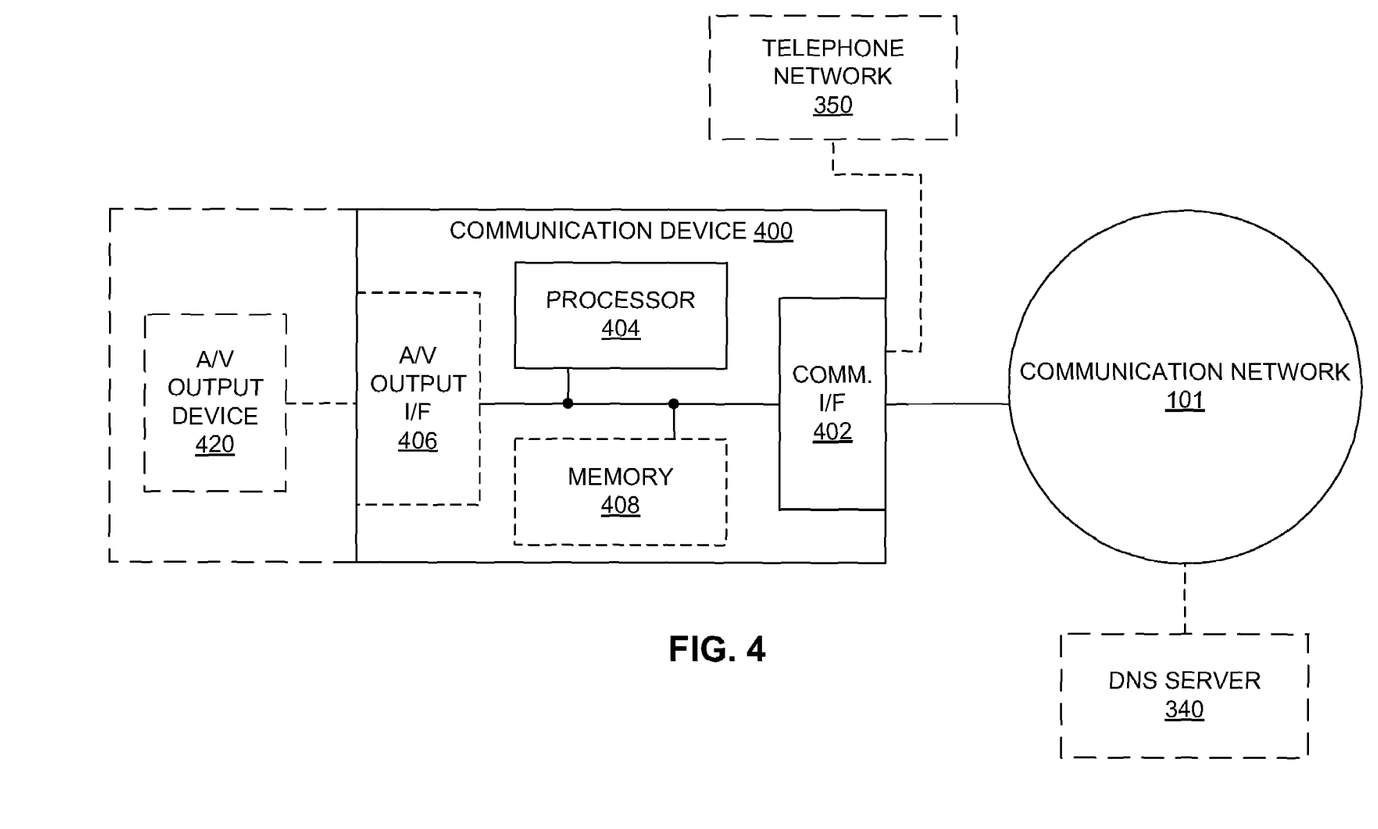
FIG. 4 is a block diagram of a communication device according to an embodiment of the invention.

FIG. 4 provides a block diagram of an example of a communication device 400 that may represent the communication device 140 of FIG. 1 in one embodiment. Generally, the communication device 400 may be any device capable of receiving audio/video data over a communication network 101 from the audio/video node 300 of FIG. 3. Examples of the communication device 400 may include a computer, a cellular phone, a personal digital assistant (PDA), or a network-attachable television or video display device.

The communication device 400 includes a communication interface 402 and a processor 404. As with the communication interface 302 of the audio/video node 300, the communication interface 402 may include circuitry to couple the communication device 400 to a phone line, coaxial cable, or other means for connection with a network service provider, such as an ISP. For example, the communication interface 402 may include circuitry for operating as a DSL or cable modem for connection with a phone line or coaxial cable.

In another example, the communication interface 302 may include circuitry for connecting the communication device 400 with an external network gateway or router, such as a DSL or cable modem, for coupling with the network 101. Such a connection may be wired (such as by way of an Ethernet connection) or wireless (such as through a Wi-Fi connection). Other methods for connecting the communication device 400 with the communication network 101 may be utilized in other examples.

The processor 404 of FIG. 4 is coupled with the communication interface 402. In one implementation, the processor 404 may be one or more microprocessors, microcontrollers, DSPs, or any other processor configured to execute software instructions for performing the various tasks identified with the processor 404, as discussed hereinafter. The software may be stored in a memory, such as a memory 408 shown in FIG. 4, or a memory located internal to the processor 404. In another example, the processor 404 may be a collection of hardware logic circuitry to perform the functions described below, or a combination of software and hardware elements.

The processor 404 of the communication device 400 is configured to receive a message including the network address from the audio/video node 300. As a result, the processor 404 is notified of a recent change in the network address of the node 300, thus allowing the processor 404 to forego querying a DNS or similar server 340 coupled with the communication network 101 for the current network address of the node 300. As described above, the message may take the form of an e-mail message, an instant messaging message, an SMS message, or some other type of message that is not necessarily transported over the communication network 101. For example, an SMS message containing the node 300 network address may be transmitted over the telephone network 350 first mentioned in FIG. 3. Further, the message may include the domain name of the node 300 to positively identify the network address in the message with the domain name of the node 300, as described above.

The processor 404 may be configured to associate the received network address with the domain name of the audio/video node 300, or directly with the audio/video node 300, without the involvement or knowledge of a user of the communication device 400. For example, the processor 404 may receive by way of the communication interface 402 an e-mail, SMS, or instant messaging message, and parse or otherwise process the message to determine that the message contains a new network address for the audio/video node 300. The processor 404 may then note the new network address and prevent the message from being displayed to a user of the communication device 400. In such an embodiment, the processor 404 may or may not alert the user that the message was received. In another implementation, the processor 404 may rely on the user to ascertain that the message received includes a new network address for the node 300, and to cause the processor 404 to save the received network address for future communications with the node 300.

In one example, the processor 404 may be configured to transmit a communication identifier, such as an e-mail address, telephone number, or the like, of the communication device 400 via the communication interface 402 over the network 101 to the audio/video node 300. The audio/video node 300 could then utilize this Once the processor 404 has received the latest network address of the audio/video node 300, the processor 404 may transmit a request for audio/video data from the node 300 using the received network address, as discussed in detail above. The request is transmitted through the communication interface 402 over the network 101 to the node 300. In response to the request, the node 300 transmits the requested audio/video data, such as a news or entertainment program, over the network 101, which the processor 404 receives by way of the communication interface 402.

Upon receiving the audio/video data, the processor 404 may then transfer that data by way of an audio/video interface 406 to an audio/video output device 420, such as a television, audio/video receiver, or other display-oriented device, for consumption by the user. In some circumstances, the output device 420 may be incorporated within the communication device 400, such as a cellular phone, PDA, or laptop computer. In another example, the processor 404 may store the received audio/video data in the memory 408 of the communication device 400 for later presentation to the user via the audio/video output interface 406.

In the event the communication device 400 is not successful in connecting with the audio/video node 300 (e.g., the request issued by the communication device 400 was not received by the node 300), the device 400 may not be in possession of the current network address of the node 300. As a result, the processor 404 may query the DNS server 340 through the communication interface 402 over the network 101 with the domain name of the node 300 to acquire the current network address (e.g., the current IP address) of the node 300 to allow the device 400 to subsequently request audio/video data therefrom.

Various embodiments as described herein may provide a number of benefits. By enabling an audio/video node of a communication network to update other communication devices with the current network address of the node, those communication devices may connect directly to the audio/video node to receive audio/video data from the node without the use of a domain name, and hence without the aid of a DNS server. Such capability allows the communication devices, such as computers, cell phones, PDAs, and so on, to forego accessing a DNS server to acquire the network address of the node in most cases, thus reducing the timing overhead required to access audio/video data of interest from the node. Further, as an owner of a large network sub-domain is often required to supply one or more DNS servers to field queries for that sub-domain, the owner may be able to supply a smaller, less expensive server that what is typically required, due to the reduced number of network address queries expected from communication devices by implementation of the concepts described herein.

While several embodiments of the invention have been discussed herein, other embodiments encompassed by the scope of the invention are possible. For example, while various embodiments have been described primarily within the context of audio/video nodes capable of providing audio/video programming and data on demand over a wide-area communication network to a requesting device, virtually any device capable of communicating and transferring data over a communication network, such as web servers, financial data servers, File Transfer Protocol (FTP) servers, and many other types of systems, may employ various aspects of the disclosure as well. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method comprising:
receiving at a first user audio/video device a communication identifier associated with a second user audio/video device;
receiving at the first user audio/video device an updated network address of the first user audio/video device over a communication network from a network provider;
in response to receiving the network address, transferring from the first user audio/video device a message to the second user audio/video device using the communication identifier, wherein the message comprises the network address;
receiving at the first user audio/video device a request for audio/video data, wherein the request is transferred from the second user audio/video device over the communication network to the first user audio/video device using the network address, and wherein the request is received subsequent to transferring the message to the second user audio/video device; and
in response to receiving the request, transferring the audio/video data from the first user audio/video device over the communication network to the second user audio/video device.

2. The method of claim 1, wherein the message comprises a short message service message.

3. The method of claim 1, wherein the message comprises an electronic mail message.

4. The method of claim 1, wherein the message comprises an instant messaging message.

5. The method of claim 1, wherein the network address comprises an internet protocol address.

6. The method of claim 1, wherein the communication identifier comprises at least one of a telephone number, an internet protocol address, and an e-mail address.

7. The method of claim 1, further comprising:
receiving at the first user audio/video device the audio/video data from an audio/video receiver coupled with the first user audio/video device.

8. The method of claim 1, further comprising:
connecting the first user audio/video device to a network service provider to provide access to the communication network by the first user audio/video device; wherein the network address of the first user audio/video device is received over the communication network from the network service provider.

9. The method of claim 1, wherein the second user audio/video device comprises a computer.

10. The method of claim 1, wherein the second user audio/video device comprises a mobile communication device.

11. A first user audio/video device, comprising:
a communication interface configured to couple the first user audio/video device to a communication network; and
a processor configured to:
receive a communication identifier associated with a second user audio/video device that is accessible through the communication interface over the communication network;
receive an updated network address of the first user audio/video device over the communication network through the communication interface from a network provider;
in response to receiving the network address, transmit a message to the second user audio/video device using the communication identifier, wherein the message comprises the network address;
receive a request for audio/video data from the second user audio/video device over the communication network through the communication interface, wherein the request is received subsequent to transmitting the message to the second user audio/video device; and
in response to receiving the request, transfer the audio/video data through the communication interface over the communication network to the second user audio/video device.

12. The first user audio/video device of claim 11, wherein the message comprises at least one of a short message service message, an electronic mail message, and an instant messaging message.

13. The first user audio/video device of claim 11, wherein the network address comprises an internet protocol address.

14. The first user audio/video device of claim 11, further comprising:
an audio/video interface configured to receive the audio/video data from an audio/video source.

15. The first user audio/video device of claim 14, further comprising:
a memory configured to store the audio/video data.

16. The first user audio/video device of claim 11, wherein:
the processor is configured to receive the network address from a network service provider over the communication network through the communication interface.

17. A second user audio/video device, comprising:
a communication interface configured to couple the second user audio/video device to a communication network; and
a processor configured to:
receive a message from a first user audio/video device, wherein the message comprises an updated network address of the first user audio/video device from a network provider;
transmit a request for audio/video data through the communication interface over the communication network to the first user audio/video device using the network address, wherein the request is transmitted subsequent to receiving the message from the first user audio/video device; and
receive the audio/video data from the first user audio/video device over the communication network through the communication interface.

18. The second user audio/video device of claim 17, wherein:
the message comprises at least one of a short message service message, an electronic mail message, and an instant messaging message; and the network address comprises an internet protocol address.

19. The second user audio/video device of claim 17, wherein:
the processor is configured to prevent display of the message received from the first user audio/video device to a user of the second user audio/video device.

20. The second user audio/video device of claim 17, wherein:
the processor is configured to transmit a communication identifier associated with the second user audio/video device through the communication interface over the communication network to the first user audio/video device to allow first user audio/video device to transmit the network address to the second user audio/video device.

* * * * *